UNITED STATES PATENT OFFICE.

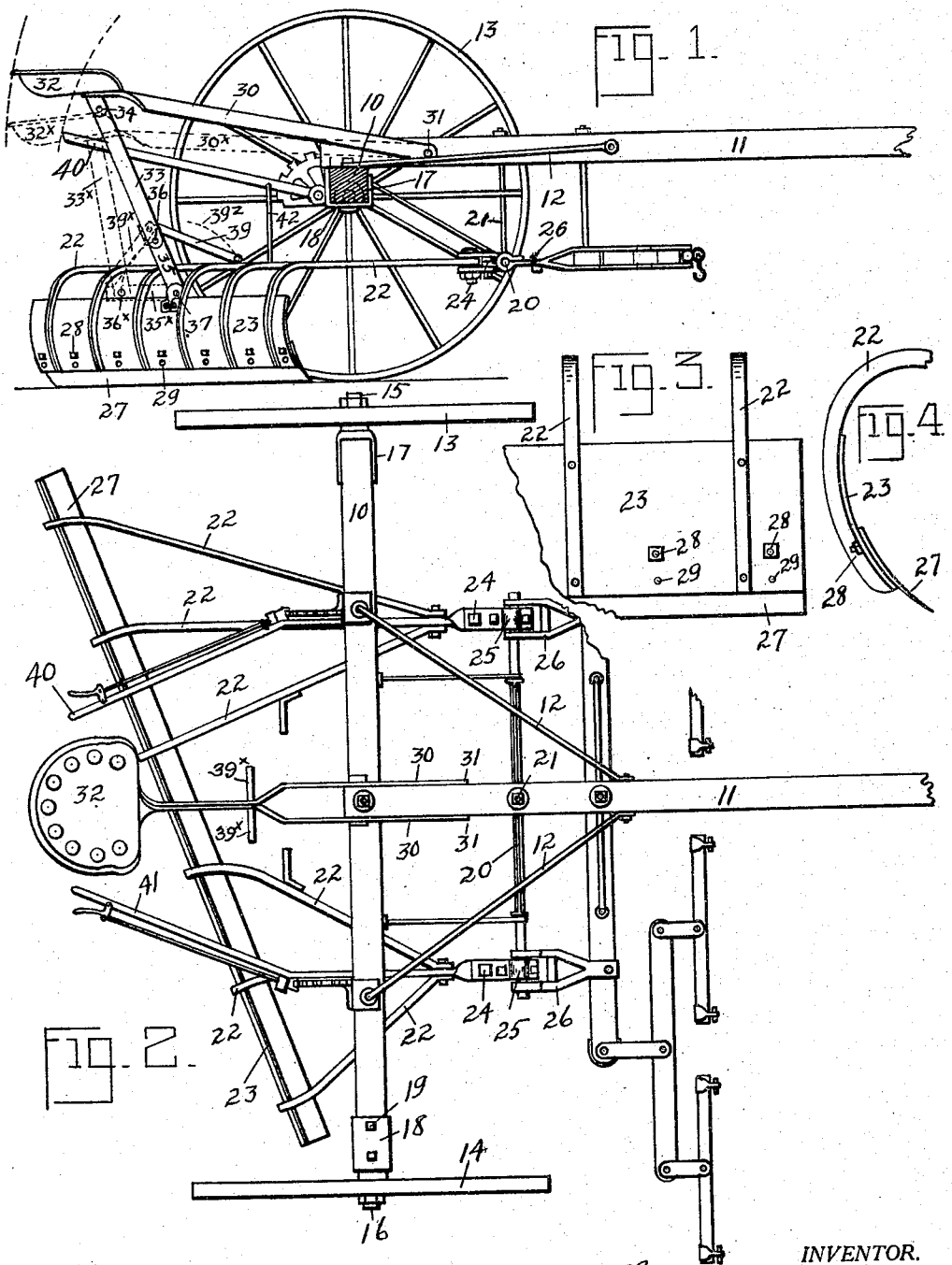

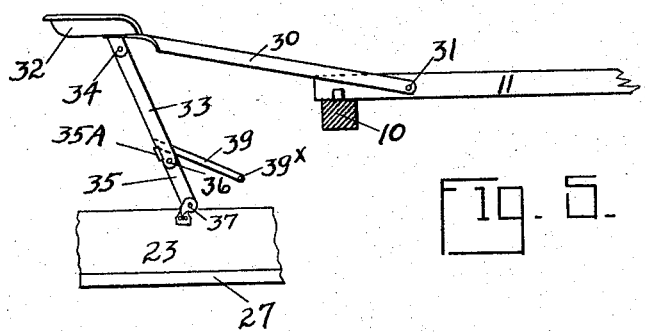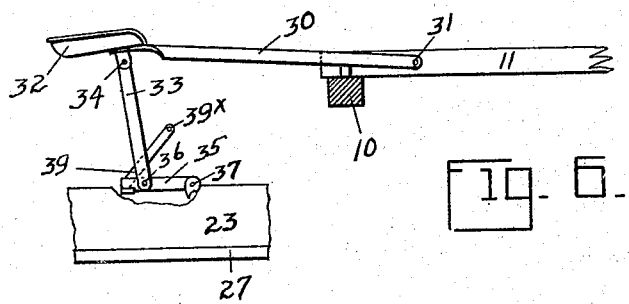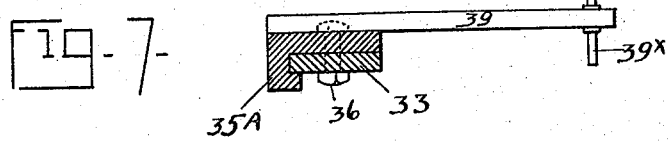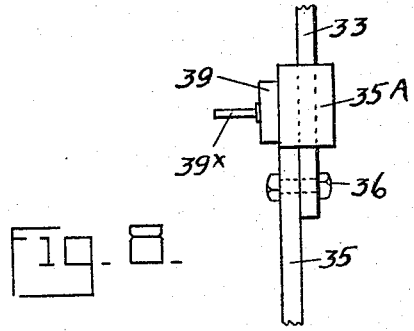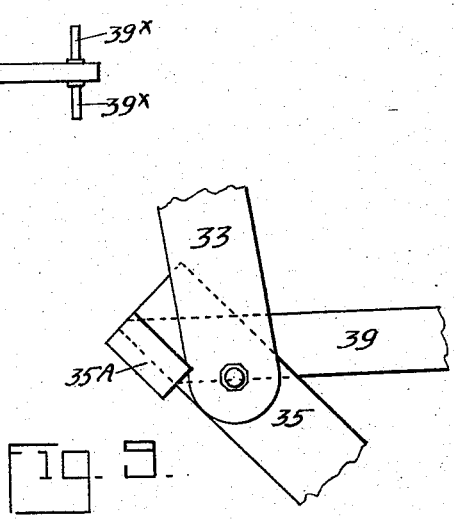

LAWRENCE GAST, OF NEWTON, KANSAS.

ROAD-DRAG.

1,179,000.  Specification of Letters Patent.  Patented Apr. 11, 1916.

Application filed August 24, 1915. Serial No. 47,179.

*To all whom it may concern:*

Be it known that I, LAWRENCE GAST, a resident of Newton, in the county of Harvey and State of Kansas, have invented certain new and useful Improvements in Road-Drags, of which the following is a description, referring to the accompanying drawings, which form a part of this specification.

The principal objects of the invention are to construct a road drag to be drawn by one or more teams and to be operated by one man; also by mechanical means to transmit the weight of the operator to the mold board and sheer; and of means for lifting the shear of said drag from contact with the earth.

In the drawings Figure 1 is a side view of the road drag with the near wheel removed for convenience of illustration. Fig. 2 is a top view with portions of the double trees removed to admit of other details. Fig. 3 is a rear view of one end of the mold board. Fig. 4 is an end view of the mold board. Fig. 5 shows the position of the driver's seat and allied parts when the driver desires to transmit his weight to the mold board. Fig. 6 shows the position of the driver's seat and allied parts when the driver's weight is borne by the axle. A portion of the mold board being broken away to disclose the parts more fully. Figs 7, 8 and 9 are detail views of the jointed stanchion bars and foot lever seen in Figs. 1, 2, 5 and 6.

Similar numerals of reference indicate corresponding parts in all the figures of the drawings.

Referring to the drawings, at 10 is seen an axle, at 11 a tongue connected by brace rods 12, 12 to axle 10. Wheels 13 and 14 rotate on spindles 15 and 16 attached to the axle 10. The manner of attaching these spindles to the axle is novel, each spindle terminates in a channel like portion having flanges 17 and base 18. The axle 10 lies within the channel 17, 18 being bolted as at 19 to the portion 18. It will be observed in Figs. 1 and 2 that the spindle 15 lies below the center of the axle. In Fig. 2 the part 18 of spindle 16 is seen above the axle, thus said axle 10 would be lowered at that end. It is obvious that this arrangement may be reversed and the axle dropped at spindle 15 and raised at spindle 16 or the axle leveled by bolting the parts 18, 18 of 15 and 16 on the same side of axle 10. This spindle adjustment is of great advantage in adjusting the level of the frame to the slope of the road.

At 20 is seen a rod suspended by a hanger 21 from the tongue 11. Drag arms 22 are bolted to a mold board 23. These arms 22 are pivotally attached at 24, 24 to connections 25, 25 hinged to 20. These connections form substantially universal joints allowing the mold board to be raised and lowered and swung horizontally free from the horizontal and perpendicular motion of the running gear. The double tree connections 26, 26 are also hingedly attached to 20 thereby permitting upward and downward movement.

The construction of the shear 27 and mold board 23 is clearly seen in Figs. 3 and 4. The shear 27 is adjustable by removing the bolts at 28 and rebolting the shear to the mold board 23 at the lower holes 29.

Bars 30, 30 pivotally attached to the tongue at 31 are fastened to the underside of the seat 32. At 33 in Figs. 1 and 5 is seen a stanchion bar hingedly attached to the underside of the seat 32 at 34. At 35 in Figs. 1 and 5 is a second stanchion bar which is connected with 33 through the joint at 36. This bar 35 is hingedly connected at 37 with the mold board 23. As seen in Fig. 1 the bars 33 and 35 being in a straight line will transmit the weight of the driver, seated upon 32 directly to the mold board 23. The bars 33 and 35 being hinged at 36, the seat 32 and these bars would ordinarily stand as shown in Fig. 6 or in the dotted line position represented by the figures $32^x$, $33^x$, $35^x$, Fig. 1, in which position the bars 30, 30 take the position as seen at $30^x$ resting on the axle 10, and $36^x$ represents the position of the joint 36.

At 39 Figs. 1, 5, 6, 7, 8 and 9 is shown a lever terminating in two foot treads $39^x$, $39^x$. The lever 39 is a part of or rigidly connected to the bar 35, the bar 35 being provided with a stop $35^A$. Now when the road drag is in operation and the driver desires to transmit his weight to the mold board, the parts being in the position shown in Fig. 6, the driver places his feet on the treads $39^x$ and in the natural manner of rising to his feet exerts pressure on said treads $39^x$ to drive them through the arc $39^z$, Fig. 1 until the position seen in Fig. 5 is reached when the stop $35^A$ contacts with bar 33 and the bars 30, 30 stand off the axle 10, in this position the weight of the seat 32 and occupant is carried directly by the mold board.

At 40 and 41 are levers which connect by bars 42, with the arms 22 for raising the drag from the ground; these levers 40 and 41 may work independently of each other. This act of raising the drag is accomplished when the seat and stanchion bars occupy the dotted position seen in Fig. 1.

Such other modifications may be employed as are within the scope of the appended claims.

Having fully described my invention what I now claim as new and desire to secure by Letters Patent is:—

1. In a road drag, an axle, spindles on said axle, wheels mounted on said spindles, a driver's seat in rear of said axle, said seat being hingedly attached to the tongue, a mold board pivotally attached to the drag, a jointed stanchion hingedly attached to and connecting said seat and mold board and means whereby the weight of said seat and its occupant may be directly transmitted to the mold board.

2. A road drag having an axle, spindles and a tongue, a pair of wheels mounted on said spindles, a driver's seat in rear of the axle, and bars supporting said seat, hingedly attached to the tongue and normally supported by the axle, a mold board pivotally attached to the drag, a jointed stanchion hingedly attached to both said seat and mold board and means whereby said jointed stanchion may operate to raise the hinged seat bars from contact with said axle and directly transmit the weight of said seat and its occupant to the mold board.

3. A road drag having an axle, spindles and a tongue, a pair of wheels mounted on said spindles which are adjustably attached to the axle, bars hingedly attached to said tongue and normally supported by the axle, and a driver's seat mounted on said bars; a mold board and shear, said mold board being pivotally attached to the drag, a jointed stanchion hinged to said seat and mold board, and a foot lever attached to said stanchion, pressure on said foot lever operating to lift the hinged seat bars from contact with the axle and move said stanchion to a new position whereby the weight of said seat and occupant is directly transmitted to said mold board.

4. A road drag having an axle and tongue, spindles adjustably attached to said axle, wheels on said spindles, bars attached to said tongue resting on said axle, a seat mounted on said bars, a mold board and shear, said mold board being pivotally attached to the drag, a jointed stanchion hinged to both seat and mold board and independent levers attached to the frame work and mold board for raising said mold board.

5. A road drag comprising an axle, a tongue, a driver's seat hingedly attached to said tongue, a mold board, a jointed stanchion hingedly attached to said seat and mold board, said stanchion transmitting the weight of seat and occupant directly to the mold board when desired, and means for releasing said seat weight from said mold board and for transmitting it to the axle.

LAWRENCE GAST.

Witnesses:
U. G. CHARLES,
B. H. TURNER.

Copies of this patent may be obtained for five cents each, by addressing the "Commissioner of Patents, Washington, D. C."